(12) United States Patent
Yagi

(10) Patent No.: US 10,981,460 B2
(45) Date of Patent: Apr. 20, 2021

(54) VEHICLE CHARGING DEVICE AND VEHICLE CHARGING/DISCHARGING DEVICE

(71) Applicant: MITSUBISHI ELECTRIC CORPORATION, Tokyo (JP)

(72) Inventor: Hiroki Yagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/638,697

(22) PCT Filed: Feb. 15, 2019

(86) PCT No.: PCT/JP2019/005517
§ 371 (c)(1),
(2) Date: Feb. 12, 2020

(65) Prior Publication Data
US 2020/0384874 A1 Dec. 10, 2020

(51) Int. Cl.
*B60L 53/30* (2019.01)
*B60L 53/16* (2019.01)
*B60L 53/18* (2019.01)

(52) U.S. Cl.
CPC ............... *B60L 53/30* (2019.02); *B60L 53/16* (2019.02); *B60L 53/18* (2019.02)

(58) Field of Classification Search
CPC ...................................................... B60L 53/30
USPC ......................................................... 320/109
See application file for complete search history.

(56) References Cited

U.S. PATENT DOCUMENTS

| 8,890,475 B1 * | 11/2014 | Becker .................. B60L 53/665 320/109 |
| 2013/0069588 A1 | 3/2013 | Oda et al. |
| 2013/0257373 A1 * | 10/2013 | Mallon, IV ............. B60L 53/31 320/109 |
| 2016/0009189 A1 * | 1/2016 | Yoshizawa .............. B60L 53/20 307/9.1 |

(Continued)

FOREIGN PATENT DOCUMENTS

| JP | 2012-16179 A | 1/2012 |
| JP | 2012-90407 A | 5/2012 |

(Continued)

*Primary Examiner* — Jerry D Robbins
(74) *Attorney, Agent, or Firm* — Birch, Stewart, Kolasch & Birch, LLP

(57) ABSTRACT

A vehicle charging device includes a charger to electrically charge a storage battery mounted in an electric vehicle. The vehicle charging device comprises: a housing in which the charger is housed; a charging cable having one end side and an opposite end side, the one end side including an end portion connected to the charger, the opposite end side including an end portion connected to a connector to be connected to the electric vehicle, the opposite end side including a portion pulled out from an inside of the housing to an outside of the housing; and a cable holder provided on one side surface of the housing, the cable holder holding an intermediate portion of the charging cable pulled out to the outside of the housing. The cable holder includes: a cable holder guide portion secured to the one side surface of the housing; and a cable holder movable portion attached to the cable holder guide portion such that the cable holder movable portion is movable in a height direction of the housing.

18 Claims, 7 Drawing Sheets

(56) References Cited

U.S. PATENT DOCUMENTS

2016/0089996 A1* 3/2016 Sugiura .................. B60L 53/16
                                                      320/109
2017/0210238 A1* 7/2017 Buehs ................... H02J 7/0045
2019/0249387 A1* 8/2019 Horie ........................ E02D 5/24

FOREIGN PATENT DOCUMENTS

| JP | 2013-43717 A | 3/2013 |
| JP | 2013-70479 A | 4/2013 |
| JP | 5442587 B2 | 3/2014 |

* cited by examiner

VEHICLE CHARGING DEVICE AND VEHICLE CHARGING/DISCHARGING DEVICE

FIELD

The present invention relates to a vehicle charging device including a charger that electrically charges a storage battery mounted in an electric vehicle, and a vehicle charging/discharging device including a charger/discharger that exchanges electric power with a storage battery mounted in an electric vehicle.

BACKGROUND

Electric vehicles such as electric cars (EVs) and plug-in hybrid electric vehicles (PHEVs) become popular these days. With the spread of electric vehicles, household vehicle charging devices charged with electric power supplied from a commercial system become popular. Further, Vehicle to Home (V2H) systems such as vehicle charging/discharging devices become popular. Such a V2H system is designed such that a storage battery for driving an electric vehicle is electrically charged with electric power supplied from a commercial system, and the storage battery for driving the electric vehicle discharges and supplies electric power to a household electrical equipment that is a residential load.

For example, a vehicle charging/discharging device of a V2H system includes a housing and a charging/discharging cable. The housing houses therein a charger/discharger. The charging/discharging cable is connected to a connector for electrical connection to a driving storage battery mounted in an electric vehicle such as an electric car or a plug-in hybrid electric vehicle. A vehicle charging/discharging device has a conversion function of converting electric power supplied from a commercial system into electric power for charging an electric vehicle. The vehicle charging/discharging device also has a conversion function of converting electric power of a storage battery for driving an electric vehicle into electric power that can be supplied to a residential load. The vehicle charging/discharging device further has a control function of controlling the conversion functions.

The charging/discharging cable of the vehicle charging/discharging device has a thick cable diameter for the purpose of delivering a large amount of electric power. Further, it is thought that the vehicle charging/discharging device is typically installed outdoors. For this reason, in many cases, the coating of the charging/discharging cable of the vehicle charging/discharging device is made of a strong material providing the coating with a great thickness for the purpose of improving durability.

The charging/discharging cable formed as described above is difficult to route because such a charging/discharging cable is heavy and difficult to bend. For this reason, the operation of connecting the connector of the vehicle charging/discharging device to the electric vehicle provides a burden on a user.

The charging/discharging cable, which is a component frequently used to charge and discharge the storage battery of the electric vehicle, is required to have improved routing performance for reducing a load which the user bears in connecting the connector of the vehicle charging/discharging device to the electric vehicle.

Patent Literature 1 discloses a structure that facilitates the cable routing to reduce the burden which the user bears in electrically charging a storage battery of an electric vehicle. A charging device disclosed in Patent Literature 1 includes a housing, a charging cable, an arm, a first support portion, and a second support portion. The housing houses therein a charger for electrically charging a battery of an electric car. The charging cable is connected between the charger and the battery. The arm expands and contracts in a horizontal direction. The first support portion supports the charging cable at a first position in the longitudinal direction in which the arm expands and contracts. The second support portion supports the charging cable at a second position in the longitudinal direction in which the arm expands and contracts.

For the charging device disclosed in Patent Literature 1, the charging cable pulled out from the housing is routed along the arm, thereby bringing the plug connected to the tip of the charging cable close to the electric vehicle. The charging device disclosed in Patent Literature 1 reduces the burden which the user bears in connecting the plug to an electric vehicle, because the arm bears the weight of the charging cable.

CITATION LIST

Patent Literature

Patent Literature 1: Japanese Patent No. 5442587

SUMMARY

Technical Problem

Unfortunately, the charging device disclosed in Patent Literature 1 is required to provide the arm with a plurality of movable portions to increase the degree of freedom in the charging cable routing. As a result, the structure is so complicate that the malfunction is highly likely to occur.

The present invention has been made in view of the above, and an object of the invention is to provide a vehicle charging device capable of improving cable routing performance with a simple structure.

Solution to Problem

To solve the above problem and achieve the object, a vehicle charging device according to the present invention includes a charger to electrically charge a storage battery mounted in an electric vehicle. The vehicle charging device comprises: a housing in which the charger is housed; a charging cable having one end side and an opposite end side, the one end side including an end portion connected to the charger, the opposite end side including an end portion connected to a connector to be connected to the electric vehicle, the opposite end side including a portion pulled out from an inside of the housing to an outside of the housing; and a cable holder provided on one side surface of the housing, the cable holder holding an intermediate portion of the charging cable pulled out to the outside of the housing. The cable holder includes: a cable holder guide portion secured to the one side surface of the housing; and a cable holder movable portion attached to the cable holder guide portion such that the cable holder movable portion is movable in a height direction of the housing.

Advantageous Effects of Invention

A vehicle charging device according to the present invention has an effect of improving the cable routing performance with the simple structure.

DESCRIPTION OF EMBODIMENTS

The following is a detailed description of a vehicle charging device and a vehicle charging/discharging device according to an embodiment of the present invention, with reference to the drawings. Note that the present invention is not limited by this embodiment.

First Embodiment

Figure 1:
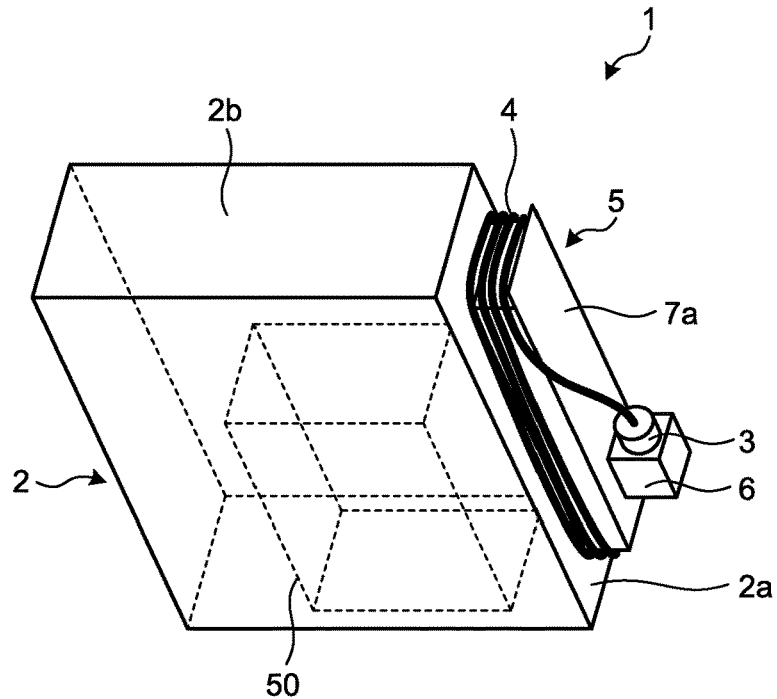
FIG. 1 is a perspective view of a vehicle charging device according to a first embodiment of the present invention.
Figure 2:
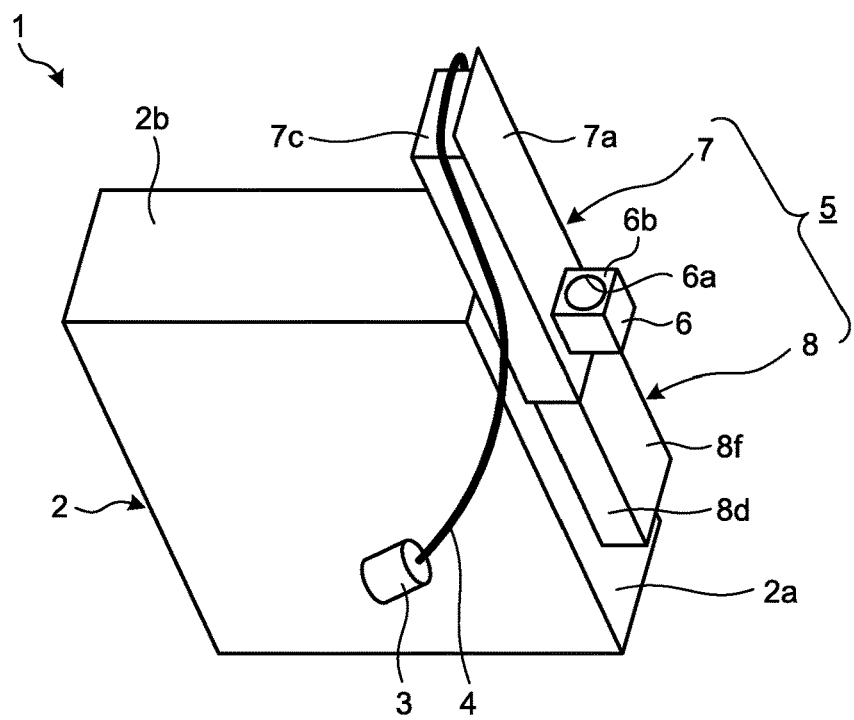
FIG. 2 is a perspective view illustrating a state in which the cable holder movable portion of the cable holder in the vehicle charging device illustrated in FIG. 1 has moved upward.
Figure 3:
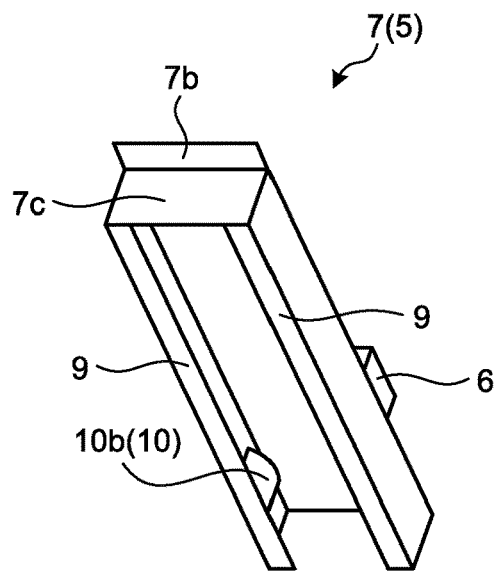
FIG. 3 is a perspective view of the cable holder movable portion of the cable holder in the vehicle charging device illustrated in in FIG. 1.
Figure 4:
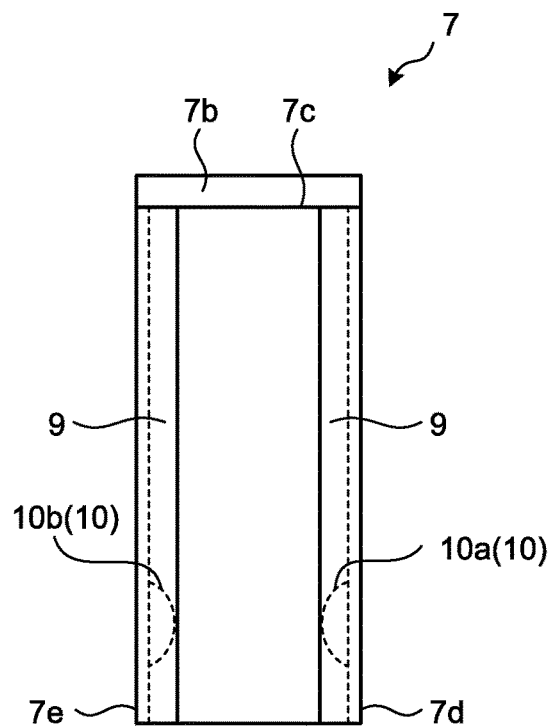
FIG. 4 is a diagram illustrating the cable holder movable portion of the cable holder in the vehicle charging device illustrated in in FIG. 1.
Figure 5:
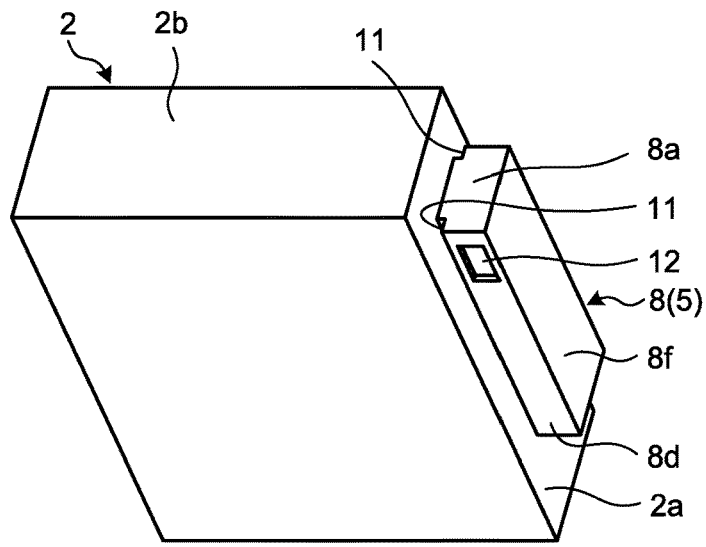
FIG. 5 is a perspective view of the housing and the cable holder guide portion in the vehicle charging device illustrated in in FIG. 1.
Figure 6:
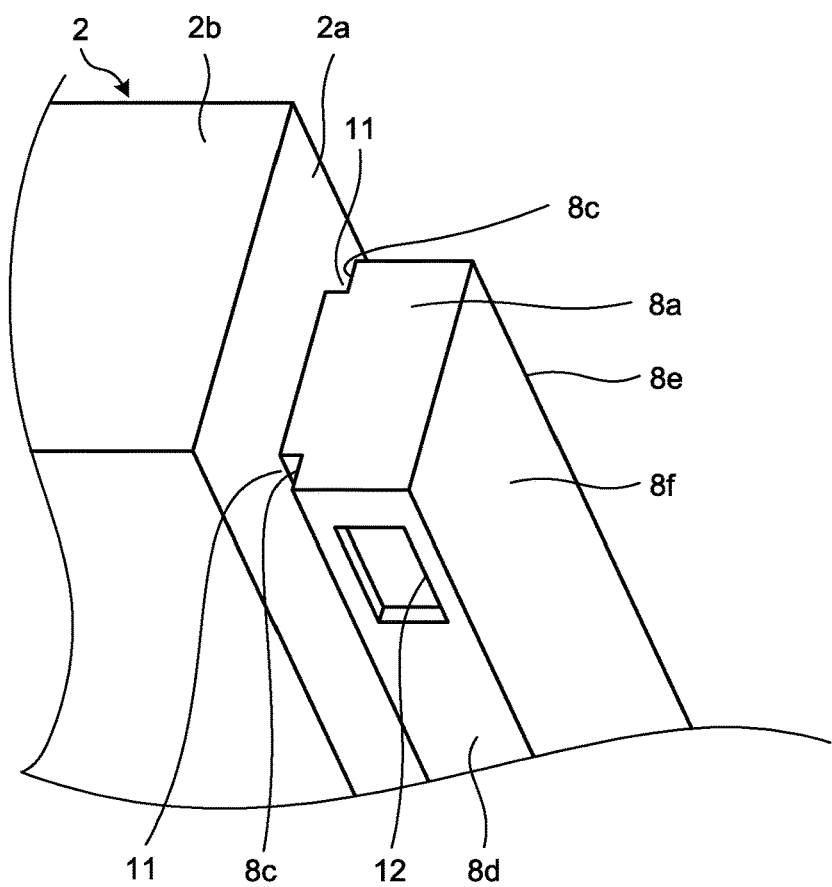
FIG. 6 is an enlarged perspective view of the relevant portions, illustrating the housing and the cable holder guide portion illustrated in FIG. 5.
Figure 7:
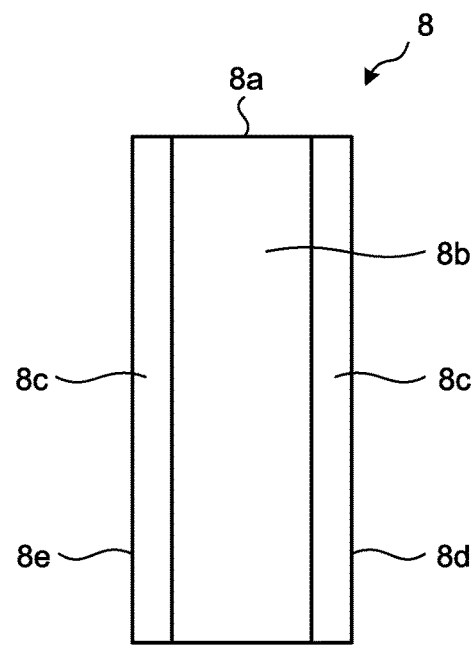
FIG. 7 is a diagram illustrating the cable holder guide portion in the vehicle charging device illustrated in in FIG. 1.

FIG. 1 is a perspective view of a vehicle charging device 1 according to a first embodiment of the present invention. FIG. 2 is a perspective view illustrating a state in which the cable holder movable portion 7 of a cable holder 5 in the vehicle charging device 1 illustrated in FIG. 1 has moved upward. FIG. 3 is a perspective view of the cable holder movable portion 7 of the cable holder 5 in the vehicle charging device 1 illustrated in in FIG. 1. FIG. 4 is a diagram illustrating the cable holder movable portion 7 of the cable holder 5 in the vehicle charging device 1 illustrated in in FIG. 1. FIGS. 3 and 4 illustrate a state in which the cable holder movable portion 7 detached from a cable holder guide portion 8 is viewed from a side facing a housing 2. FIG. 5 is a perspective view of the housing 2 and the cable holder guide portion 8 in the vehicle charging device 1 illustrated in in FIG. 1. FIG. 5 illustrates a state in which the cable holder movable portion 7 has been detached from the cable holder 5. FIG. 6 is an enlarged perspective view of the relevant portions illustrating the housing 2 and the cable holder guide portion 8 illustrated in FIG. 5. FIG. 7 is a diagram illustrating the cable holder guide portion 8 in the vehicle charging device 1 illustrated in in FIG. 1. FIG. 7 illustrates a state in which the cable holder guide portion 8 is viewed from a side facing the housing 2.

The vehicle charging device 1 is installed, with a side surface 2a of the housing 2 oriented in parallel to the vertical direction. In the first embodiment, the up-and-down direction is the height direction of the vehicle charging device 1 when the vehicle charging device 1 is installed at an appropriate installation location. That is, the up-and-down direction is the vertical direction when the vehicle charging device 1 is installed. Further, the height direction of the vehicle charging device 1 when the vehicle charging device 1 is installed is the height direction of the housing 2 when the vehicle charging device 1 is installed, and the height direction is a direction parallel to the longitudinal direction of the side surface 2a of the housing 2 in FIG. 1.

The vehicle charging device 1 illustrated in FIG. 1 is a device that is charged with electric power supplied from a commercial system. The vehicle charging device 1 supplies the electric power to a storage battery for driving an electric vehicle such that the vehicle charging device 1 can electrically charge the storage battery for driving the electric vehicle. The vehicle charging device 1 performs only charging on a storage battery of an electric vehicle.

The vehicle charging device 1 according to the first embodiment has a cable holding structure for holding a charging cable 4. The cable holding structure according to the first embodiment is a cable holding structure that holds the charging cable 4 drawn from the inside of the housing 2 to the outside of the housing 2. As illustrated in FIGS. 1 and 2, the cable holding structure includes the housing 2, a charging connection portion 3, and the cable holder 5.

The housing 2, which is a main frame formed of a plate metal, houses therein a charger 50 for charging a storage battery mounted in an electric vehicle, and various electronic components (not illustrated). The housing 2, which is formed of a sheet metal, is in the form of a box having a rectangular parallelepiped shape.

The charging connection portion 3 is a connector that is connected to the electric vehicle when the vehicle charging device 1 is used. The charging connection portion 3 is attached to the charging connection portion of the electric vehicle, such that the charging connection portion 3 is electrically connected to the storage battery mounted in the electric vehicle. The charging connection portion 3 is connected to an end of the charging cable 4. In other words, the charging connection portion 3 houses therein the end of the charging cable 4. The charging connection portion 3 has a cylindrical shape extending in a direction parallel to the central axis of the charging cable 4 drawn from one end side of the charging connection portion 3. The shape of the charging connection portion 3 is not limited to any particular shape, but has a cylindrical shape so that the user can easily hold the charging connection portion 3.

The charging cable 4 has the end on one end side connected to the charger 50 in the housing 2, and has the end on the opposite end side connected to the charging connection portion 3. The charging cable 4 has a portion on the other end side, which portion is drawn from the inside of the housing 2 to the outside of the housing 2 via a cable outlet (not illustrated) formed in the side surface 2a of the housing 2. The charging cable 4 includes a conductor such as copper coated with an insulating coat, and a cover called exterior packaging covering the conductor, so that the charging cable 4 obtains flexibility.

When the vehicle charging device 1 is not used, the intermediate portion on the other end side, which is drawn out of the housing 2, is wound around the cable holder 5 as illustrated in FIG. 1, so that the charging cable 4 is supported by the cable holder 5. Further, when the vehicle charging device 1 is used, the charging cable 4 is detached from the cable holder 5, and is routed to connect the charging connection portion 3 to the electric vehicle.

The cable holder 5 is a holder that holds the intermediate portion of the charging cable 4 as the middle portion of the charging cable 4 is wound around the cable holder 5 when the vehicle charging device 1 is not used. As illustrated in FIG. 2, the cable holder 5 includes the cable holder movable portion 7 and the cable holder guide portion 8.

The cable holder guide portion 8, which is formed of a sheet metal, is in the form of a box having a rectangular parallelepiped shape. As illustrated in FIGS. 2 and 5, the cable holder guide portion 8 is secured to the side surface 2a of the housing 2, with the longitudinal direction of the rectangular parallelepiped shape being the vertical direction. When the cable holder guide portion 8 is secured, a side surface 8b facing the housing 2 is in contact with the side surface 2a of the housing 2 in the rectangular parallelepiped shape. The cable holder guide portion 8 is entirely housed in the cable holder movable portion 7 when the vehicle charging device 1 is not used. Further, when the vehicle charging device 1 is used, the cable holder guide portion 8 is partially housed in the cable holder movable portion 7 that has moved upward as described later.

The side surface 8b of the cable holder guide portion 8 has opposite ends in the depth direction of the housing 2. Cutouts 8c, which are formed at the corner portions of the opposite ends of the side surface 8b, extend in the height direction, as illustrated in FIGS. 6 and 7. The cable holder guide portion 8 and the housing 2 are secured to each other, with the side surface 8b of the cable holder guide portion 8 being in contact with the side surface 2a of the housing 2. As a result, grooves 11 in the form of recesses, which extend in the height direction, are formed between the side surface 2a of the housing 2 and the cable holder guide portion 8, as illustrated in FIGS. 5 and 6. The grooves 11 are shaped such that the grooves 11 fittingly engage guide rails 9 of the cable holder movable portion 7 as described later.

Further, as illustrated in FIGS. 5, 6, 8, and 9, the cable holder guide portion 8 includes a side surface 8d and a side surface 8e that are two side surfaces facing away from each other, and openings 12 are formed in upper regions of the side surfaces 8d and 8e. The side surface 8d and the side surface 8e, which are the two side surfaces facing away from each other in the depth direction of the housing 2, are oriented in a direction perpendicular to a direction of orientation of the side surface 8b. The single opening 12 is formed in each of the side surfaces 8d and 8e. Accordingly, the cable holder guide portion 8 has the openings 12 at two locations facing each other in the depth direction of the housing 2. The openings 12 serve as fitting engagement receiving portions for fitting engagement with the later-described leaf springs 10 of the cable holder movable portion 7.

The cable holder movable portion 7, which is formed of a sheet metal, is in the form of a box having a rectangular parallelepiped shape. The cable holder movable portion 7 is attached to the exterior of the cable holder guide portion 8, and, as illustrated in FIGS. 1 and 2, is capable of moving up and down relative to the cable holder guide portion 8 secured to the side surface 2a of the housing 2. In other words, the cable holder movable portion 7 is capable of moving up and down relative to the housing 2. Accordingly, the cable holder 5 has a function of partially moving up and down, in addition to the function of storing the charging cable 4 wound on the cable holder 5.

As illustrated in FIGS. 3 and 4, the cable holder movable portion 7 includes a guide portion 7b provided at an upper portion thereof. The guide portion 7b protrudes upward from the upper surface 7c of the cable holder movable portion 7 and prevents the charging cable 4 from being detached from the upper surface 7c of the cable holder movable portion 7.

As illustrated in FIG. 3, the cable holder movable portion 7 has its partially-open side facing the housing 2 and is open-bottomed, such that the cable holder movable portion 7 is movable up and down relative to the cable holder guide portion 8. Further, the cable holder guide portion 8 includes an outwardly exposed side surface 8f facing away from the side surface 8b, the side surface 8d, and the side surface 8e. The cable holder movable portion 7 is disposed in such a manner as to cover the exteriors of the side surface 8f, the side surface 8d, and the side surface 8e.

As illustrated in FIGS. 3 and 4, the cable holder movable portion 7 has its side facing the housing 2, and such a housing-facing side of the cable holder movable portion 7 has the guide rails 9 provided at opposite ends thereof in a width direction of the rectangular parallelepiped shape. The guide rails 9, which is to fit into the grooves 11, are provided in the height direction of the housing 2. In other words, the guide rails 9 are provided at opposite ends of the housing-facing side of the rectangular parallelepiped shape of the cable holder movable portion 7 in the depth direction of the housing 2.

The cable holder movable portion 7 is attached to the cable holder guide portion 8 from above the cable holder guide portion 8 as the guide rails 9 fit into the grooves 11 from above the grooves 11. With the guide rails 9 of the cable holder movable portion 7 fitting in the grooves 11, the cable holder movable portion 7 is guided to move up and down relative to the cable holder guide portion 8. Further, the fitting of the guide rails 9 in the grooves 11 limits movement of the guide rails 9 in directions other than the up-and-down direction. In other words, the fitting of the guide rails 9 in the grooves 11 allows the cable holder movable portion 7 to move in the up-and-down direction alone.

When the guide rails 9 fit in the grooves 11, the back face opposite to the upper surface 7c of the cable holder movable portion 7 comes into contact with the upper surface 8a of the cable holder guide portion 8, and thus, downward movement of the cable holder movable portion 7 is restricted.

The cable holder movable portion 7 includes inside faces opposite to the side surfaces 7d and 7e that are the two side surfaces facing away from each other. The cable holder movable portion 7 includes arc-like leaf springs 10 provided on lower regions of the inside faces thereof. The leaf springs 10 protrude toward the inside of the cable holder movable portion 7, as illustrated in FIGS. 3 and 4. The side surface 7d and the side surface 7e, which are the two side surfaces facing away from each other in the depth direction of the housing 2, are oriented in a direction perpendicular to a direction of orientation of a side surface 7a of the cable holder movable portion 7. The side surface 7a, which is oriented in parallel to the side surface 2a of the housing 2, faces in the same direction as the side surface 8f of the cable holder guide portion 8.

The single leaf spring 10 is provided at one location on each of the side surfaces 7d and 7e. Specifically, an arc-like leaf spring 10a, which protrudes toward the inside of the cable holder movable portion 7, is provided on a lower region of the inside face opposite to the side surface 7d of the cable holder movable portion 7. Likewise, an arc-like leaf spring 10b, which protrudes toward the inside of the cable holder movable portion 7, is provided on a lower region of the inside face opposite to the side surface 7e of the cable holder movable portion 7. In other words, the cable holder movable portion 7 has the leaf springs 10 provided at its two locations facing each other in the depth direction of the housing 2. The leaf springs 10 serve as fitting engagement protrusions for fitting engagement with the above-described openings 12 of the cable holder guide portion 8.

Accordingly, one of the cable holder movable portion 7 and the cable holder guide portion 8 in the vehicle charging device 1, i.e., the cable holder movable portion 7 has the fitting engagement protrusions provided on the inside faces thereof. Further, the other of the cable holder movable portion 7 and the cable holder guide portion 8, i.e., the cable holder guide portion 8 has the fitting engagement receiving portions provided on the side surfaces facing the inside faces of the cable holder movable portion 7 on which the fitting engagement protrusions are provided.

Figure 8:
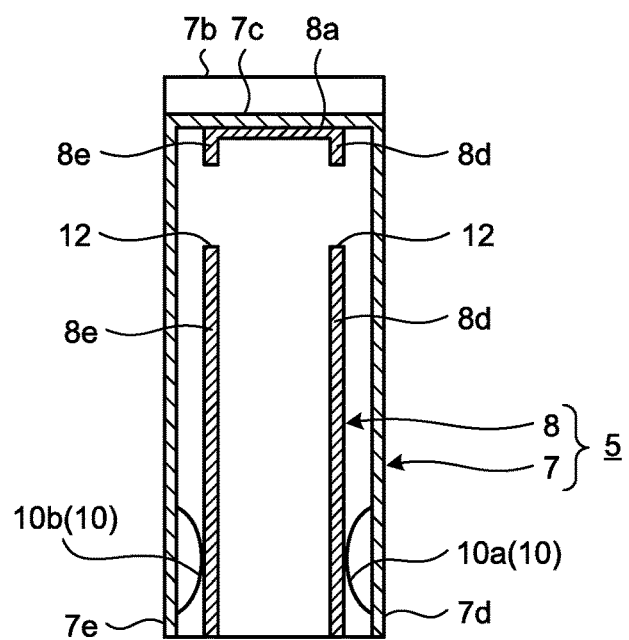
FIG. 8 is a vertical cross-sectional view of the cable holder in the vehicle charging device illustrated in FIG. 1.
Figure 9:
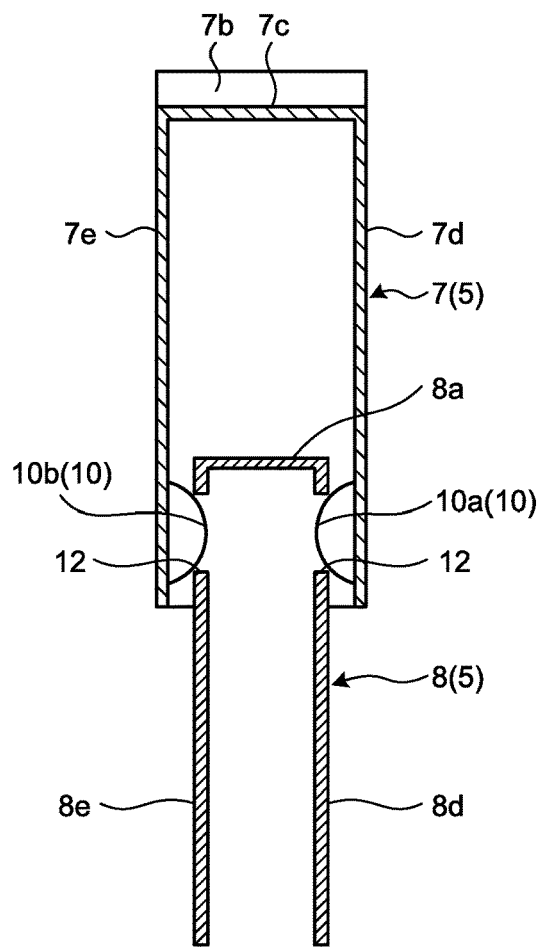
FIG. 9 is a vertical cross-sectional view of the cable holder in the vehicle charging device illustrated in FIG. 1.

FIG. 8 is a vertical cross-sectional view of the cable holder 5 in the vehicle charging device 1 illustrated in FIG. 1. FIG. 8 illustrates a case where the cable holder movable portion 7 is disposed at the lowest position. FIG. 9 is a vertical cross-sectional view of the cable holder 5 in the vehicle charging device 1 illustrated in FIG. 1. FIG. 9 illustrates a case where the leaf springs 10 fit in the openings 12 to fix the height of the cable holder movable portion 7.

When the vehicle charging device 1 is not used, the intermediate portion of the charging cable 4 is wound around the cable holder 5, with the cable holder movable portion 7 being disposed at the lowest position as illustrated in FIG. 8. The leaf springs 10 are in a compressed state when the cable holder movable portion 7 is attached to the cable holder guide portion 8 as illustrated in FIG. 8.

When the cable holder movable portion 7 attached to the cable holder guide portion 8 is moved upward as illustrated in FIG. 9, the leaf springs 10 fit in the openings 12 of the cable holder guide portion 8, such that the leaf springs 10 are released out of the compressed state. As a result, the height position of the cable holder movable portion 7 is fixed. As the leaf springs 10 fit in the openings 12, the cable holder movable portion 7 can be secured and retained at a level at which the height of the upper surface 7c of the cable holder movable portion 7 is greater than the height of the upper surface 2b of the housing 2. In other words, the leaf springs 10 and the openings 12 constitute a height position fixing structure that fixes the height position of the cable holder movable portion 7.

Further, with the cable holder movable portion 7 being attached to the cable holder guide portion 8, the leaf spring 10a presses the side surface 8d of the cable holder guide portion 8, and the leaf spring 10b presses the side surface 8e of the cable holder guide portion 8. This enables the cable holder movable portion 7 to be secured to the cable holder guide portion 8 at an appropriate height position other than the height position at which the leaf springs 10 fit in the openings 12.

A connection portion holder 6 is provided on the side surface 7a of the cable holder movable portion 7. The connection portion holder 6 holds the charging connection portion 3 when the vehicle charging device 1 is not used.

The connection portion holder 6 has a recess 6a on the upper surface 6b. A protrusion (not illustrated) of the charging connection portion 3 fits in the recess 6a when the charging connection portion 3 is housed in the connection portion holder 6. As the protrusion of the charging connection portion 3 can fit in the recess 6a, the connection portion holder 6 detachably holds the charging connection portion 3. In other words, the protrusion of the charging connection portion 3 fits in the recess 6a of the connection portion holder 6 to thereby allow the connection portion holder 6 to hold the charging connection portion 3. The engagement structure between the recess 6a and the protrusion is not limited to any particular structure, as long as the recess 6a and the protrusion are secured together.

Although the connection portion holder 6 is integrated with the cable holder 5 in the first embodiment, the connection portion holder 6 may be provided independently of the cable holder 5 while being at a distance from the cable holder 5.

Next, a description is made as to how to connect the charging connection portion 3 to the charging connection portion of an electric vehicle in using the above described vehicle charging device 1. When the vehicle charging device 1 is used, the charging connection portion 3 held by the connection portion holder 6 is first detached from the connection portion holder 6. The charging cable 4 wound around the cable holder 5 is then detached from the cable holder 5. The charging connection portion 3 is then attached to the connection portion holder 6.

The cable holder movable portion 7 is then moved upward, and the cable holder movable portion 7 is secured at the level at which the height of the upper surface 7c of the cable holder movable portion 7 is greater than the height of the upper surface 2b of the housing 2. As the leaf springs 10 of the cable holder movable portion 7 fit in the openings 12 of the cable holder guide portion 8, the cable holder movable portion 7 is secured at the level at which the height of the upper surface 7c of the cable holder movable portion 7 is greater than the height of the upper surface 2b of the housing 2.

The charging connection portion 3 is then temporarily held by the connection portion holder 6, and the intermediate portion of the charging cable 4 is hooked over the upper surface 7c of the cable holder movable portion 7 of the cable holder 5. After that, the charging connection portion 3 is detached from the connection portion holder 6, and the charging cable 4 is routed as the charging cable 4 is pulled out little by little, such that the charging connection portion 3 is brought close to the charging connection portion of the electric vehicle, and the charging connection portion 3 is connected to the charging connection portion of the electric vehicle.

The corners of the upper surface 7c of the cable holder movable portion 7 have preferably been rounded so that the coating of the charging cable 4 hooked over the upper surface 7c of the cable holder movable portion 7 would not be damaged. This prevents not only the coating of the charging cable 4 from being damaged when the charging cable 4 hooked over the upper surface 7c of the cable holder movable portion 7 is pulled, but also the charging cable 4 from getting caught on the corners of the upper surface 7c of the cable holder movable portion 7. Thus, the charging cable 4 can be smoothly routed.

Further, adjusting the attachment height of the connection portion holder 6 on the side surface 7a of the cable holder movable portion 7 enables fixing the height of the connection portion holder 6 at a higher level than the height of the upper surface 2b of the housing 2 when the leaf springs 10 fit in the openings 12 to fix the height of the cable holder movable portion 7. For the housing 2 having its low height, thus, the connection portion holder 6 is at a higher level during the connection operation, thereby improving the workability in connecting the above described charging connection portion 3 to an electric vehicle.

For the vehicle charging device 1, as described above, the fitting of the guide rails 9 of the cable holder movable portion 7 in the grooves 11 allows the cable holder movable portion 7 to move up and down in the longitudinal direction of the grooves 11. Further, as illustrated in FIGS. 2 and 9, the upward movement of the cable holder movable portion 7 allow the leaf springs 10 disposed within the cable holder movable portion 7 to fit in the openings 12 of the cable holder guide portion 8. As a result, the cable holder movable portion 7 is held and secured at the level at which the height of the upper surface 7c of the cable holder movable portion 7 is greater than the height of the upper surface 2b of the housing 2.

Furthermore, when the user attaches the charging connection portion 3 to the charging connection portion of an electric vehicle, the intermediate portion of the charging cable 4 is hooked over the cable holder movable portion 7 having moved upward. Thus, the charging cable 4 can be lifted up and routed from a higher level than the housing 2. As the charging cable 4 is routed from the higher level than the housing 2, the charging cable 4 can be routed in the air when the charging connection portion 3 is attached to the charging connection portion of the electric vehicle. The routing of the charging cable 4 in this manner results in the attachment of the charging connection portion 3 to the charging connection portion of the electric vehicle.

For the vehicle charging device 1, the charging cable 4 is lifted up when the charging connection portion 3 is connected to the charging connection portion of the electric vehicle. Thus, it is possible to prevent damage to the coating of the charging cable 4 as the charging cable 4 does not contact the ground, and hence is not dragged on the ground. Further, as there is no friction between the charging cable 4 and the ground, the performance in routing the charging cable 4 is improved. Thus, the user bears the reduced load in connecting the charging connection portion 3 to the charging connection portion of the electric vehicle.

For the vehicle charging device 1, the cable holder movable portion 7 moves up and down. Accordingly, the cable holder movable portion 7 does not hit the electric vehicle. Further, the vehicle charging device 1 does not have any elongated component for routing the charging cable 4 such as an arm protruding horizontally from the housing 2. For the vehicle charging device 1, thus, it is unlikely that that component hits the electric vehicle. Accordingly, the vehicle charging device 1 neither needs to have the housing 2 greater in height than the electric vehicle to prevent the arm from hitting the electric vehicle, nor needs to have the height of the housing 2 greater in height than necessary. As a result, the housing 2 is not larger in size. Furthermore, there is no elongated component such as the arm protruding from the housing 2, thereby providing an appearance with high design properties.

For example, in a case where an arm for improving the performance in routing the charging cable 4 protrudes horizontally from the housing 2, the arm is likely to hit the electric vehicle, depending on the height of the housing 2 and the position of the arm. If the height of the housing is made greater in height than the electric vehicle in order to prevent the arm from hitting the electric vehicle, the housing becomes larger in size. In recent years, the widespread use of electric vehicles such as electric cars and vehicle charging devices increases an demand for installation of vehicle charging devices in small parking spaces. For this reason, there is a demand for smaller housings of vehicle charging devices to increase the degree of freedom in the installation places of the vehicle charging devices, and thus an increase in the housing size conflicts with the market demand.

For the vehicle charging device 1, the structure for holding the charging cable 4 and routing the charging cable 4 is defined by the cable holder 5 that includes the cable holder movable portion 7 and the cable holder guide portion 8. As a result, without using any additional component such as a complicated arm, the vehicle charging device 1 can form a simple and inexpensive structure made up of a small number of components for easily routing the charging cable 4. Furthermore, as the cable holder 5 of the vehicle charging device 1 has a simple configuration, the possibility of failure is low.

Although the above description is made as to a case where the two leaf springs 10 are used, the number of leaf springs 10 and the number of openings 12 may be increased, depending on the weights of the charging cable 4 and the cable holder 5. Increasing the number of leaf springs 10 and the number of openings 12 ensures that the cable holder movable portion 7 is held at a level at which the height of the upper surface 7c of the cable holder movable portion 7 is greater than the height of the upper surface 2b of the housing 2, even in a case where the charging cable 4 and the cable holder 5 are heavy.

Figure 10:
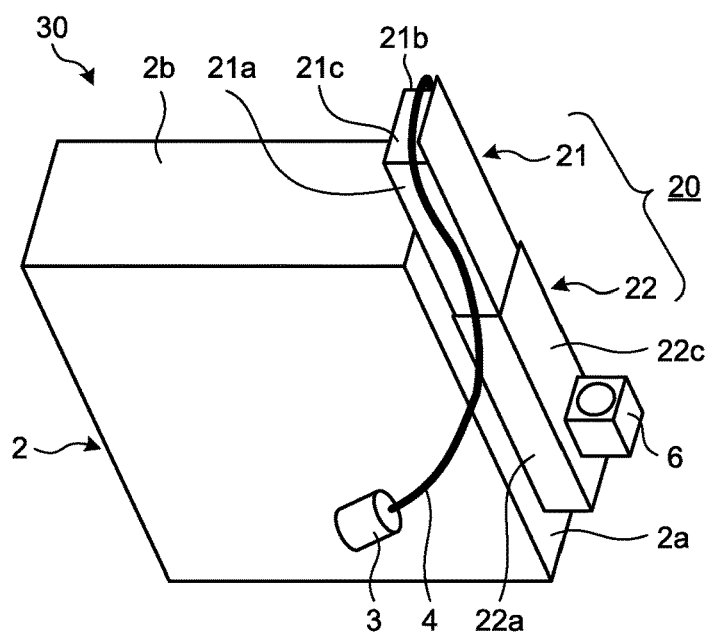
FIG. 10 is a perspective view of another vehicle charging device according to the first embodiment of the present invention.
Figure 11:
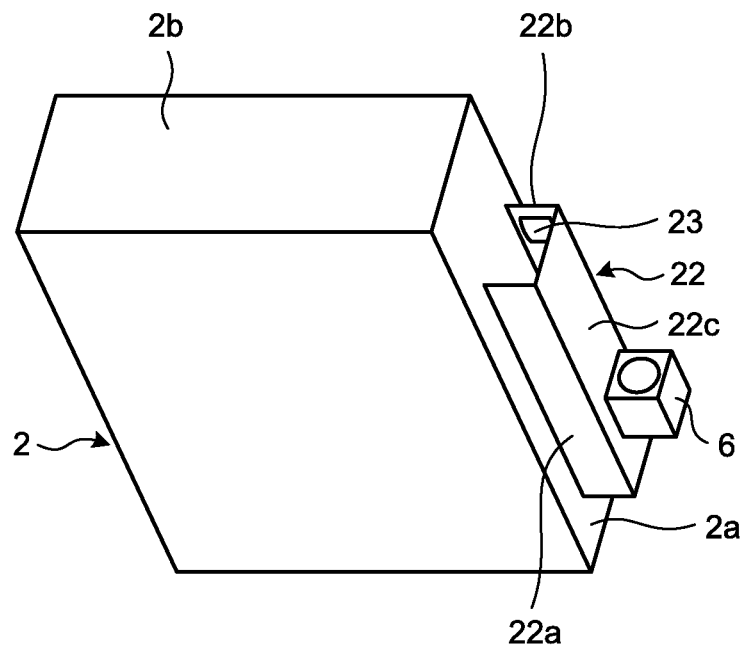
FIG. 11 is a perspective view of the housing and the cable holder guide portion in the other vehicle charging device illustrated in in FIG. 10.
Figure 12:
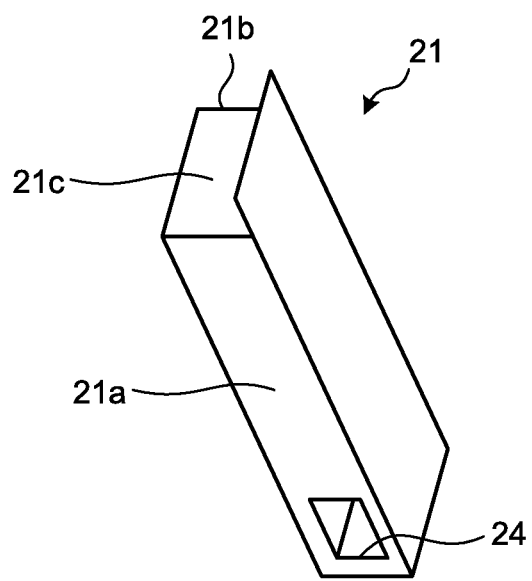
FIG. 12 is a perspective view of the cable holder movable portion of the cable holder in the other vehicle charging device illustrated in in FIG. 10.

Alternatively, the structure of the cable holder 5 of the vehicle charging device 1 is modified to invert the internal and external positional relationship between the cable holder movable portion 7 and the cable holder guide portion 8. FIG. 10 is a perspective view of another vehicle charging device 30 according to the first embodiment of the present invention. FIG. 10 illustrates a state in which a cable holder movable portion 21 of a cable holder 20 has moved upward. FIG. 11 is a perspective view of the housing 2 and a cable holder guide portion 22 in the other vehicle charging device 30 illustrated in in FIG. 10. FIG. 11 illustrates a state in which the cable holder movable portion 21 has been detached from the cable holder 20. FIG. 12 is a perspective view of the cable holder movable portion 21 of the cable holder 20 in the other vehicle charging device 30 illustrated in in FIG. 10. FIG. 12 illustrates the cable holder movable portion 21 detached from the cable holder guide portion 22. Note that, in FIG. 10, the same components as those of the vehicle charging device 1 are denoted by the same reference numerals as those used for the vehicle charging device 1.

Like the cable holder 5, the cable holder 20 of the other vehicle charging device 30 is a holder that holds the intermediate portion of the charging cable 4, as the intermediate portion of the charging cable 4 is wound around the cable holder 20 when the vehicle charging device 30 is not used. The cable holder 20 includes the cable holder movable portion 21 and the cable holder guide portion 22. As illustrated in FIG. 10, in the cable holder 20, the cable holder movable portion 21 is disposed inside, and the cable holder guide portion 22 is disposed outside the cable holder movable portion 21.

The basic functions and effects of the cable holder 20 are the same as those of the cable holder 5 described above. The cable holder 20 differs from the cable holder 5 in that the cable holder movable portion 21 is housed within the cable holder guide portion 22, and is movable up and down relative to the cable holder guide portion 22. In other words, the cable holder movable portion 21, which is movable up and down relative to the cable holder guide portion 22, have its side surfaces covered with the side surface 2a of the housing 2 and the cable holder guide portion 22.

In this case, the cable holder guide portion 22 disposed outside the cable holder 20 has a U-shaped cross-section or a groove-like cross-section perpendicular to the height direction. As the both U-shaped ends of the cable holder guide portion 22 are secured to the side surface 2a of the housing 2, the cable holder guide portion 22 is secured to the housing 2.

The cable holder guide portion 22 have side surfaces 22a and 22b that are two side surfaces facing oppositely from each other. An arc-like leaf spring 23 is provided on an upper region of each of the inside faces of the side surfaces 22a and 22b. The leaf spring 23 protrudes toward the inside of the cable holder guide portion 22. The side surface 22a and the side surface 22b, which are oriented in a direction perpendicular to a direction of orientation of the side surface 2a of the housing 2, are the two side surfaces facing away from each other in the depth direction of the housing 2.

The single leaf spring 23 is provided at one location on each of the side surfaces 22a and 22b. In other words, the leaf springs 23 are formed at two locations of the cable holder guide portion 22 that face each other in the depth direction of the housing 2. The leaf springs 23 are fitting engagement protrusions for fitting engagement with the later described openings 24 of the cable holder movable portion 21.

Further, the connection portion holder 6 is secured to a side surface 22c of the cable holder guide portion 22. The side surface 22c is the side surface oriented in a direction parallel to a direction of orientation of the side surface 2a of the housing 2 and facing in the same direction as the side surface 2a of the housing 2.

The cable holder movable portion 21 is in the form of a box having a rectangular parallelepiped shape. The cable holder movable portion 21 is housed within the cable holder guide portion 22 fixed to the side surface 2a of the housing 2, and is movable up and down relative to the cable holder guide portion 22. In other words, the cable holder movable portion 21 is movable up and down relative to the housing 2. Accordingly, the cable holder 20 has a function of partially moving up and down, in addition to the function of winding and storing the charging cable 4. The cable holder movable portion 21, which is surrounded by the side surfaces 22a, 22b, and 22c of the cable holder guide portion 22, and the side surface 2a of the housing 2, is limited in movement in directions other than the upward and downward directions.

Further, the cable holder movable portion 21a includes side surface 21a and a side surface 21b that are two side surfaces facing away from each other. Openings 24 are formed in lower regions of the side surface 21a and the side surface 21b. The side surface 21a and the side surface 21b, which are oriented in a direction perpendicular to a direction of orientation of the side surface 2a of the housing 2, are two side surfaces facing away from each other in the depth direction of the housing 2. The single opening 24 is formed at one location of each of the side surfaces 21a and 21b. In other words, the openings 24 are formed at two locations of the cable holder movable portion 21 that face each other in the depth direction of the housing 2. The openings 24 are fitting engagement receiving portions for fitting engagement with the leaf springs 23 of the cable holder guide portion 22.

For the other vehicle charging device 30, accordingly, one of the cable holder movable portion 21 and the cable holder guide portion 22, i.e., the cable holder guide portion 22 has the fitting engagement protrusions provided on inside faces thereof. Further, the other one of the cable holder movable portion 21 and the cable holder guide portion 22, i.e., the cable holder movable portion 21 has the fitting engagement receiving portions provided on the side surfaces facing the inside faces of the cable holder guide portion 22 on which the fitting engagement protrusions are provided.

The leaf springs 23 are in a compressed state when the cable holder movable portion 21 is attached to the cable holder guide portion 22. When the cable holder movable portion 21 attached to the cable holder guide portion 22 is moved upward, the leaf springs 23 fit in the openings 24 of the cable holder movable portion 21, such that the leaf springs 23 are released out of the compressed state. As a result, the height position of the cable holder movable portion 21 is fixed. As the leaf springs 23 fit in the openings 24, the cable holder movable portion 21 can be secured and retained at a level at which the height of the upper surface 21c of the cable holder movable portion 21 is greater than the height of the upper surface 2b of the housing 2. In other words, the leaf springs 23 and the openings 24 constitute a height position fixing structure that fixes the height position of the cable holder movable portion 21.

For the above described other vehicle charging device 30, when the user connects the charging connection portion 3 to the charging connection portion of an electric vehicle, the intermediate portion of the charging cable 4 is hooked over the cable holder movable portion 21 having moved upward, as in the vehicle charging device 1. Thus, the charging cable 4 can be lifted up, and routed from a higher level than the housing 2. As the charging cable 4 is routed from the higher level than the housing 2, the charging connection portion 3 can be attached in the air to the charging connection portion of the electric vehicle. The routing of the charging cable 4 in this manner results in the attachment of the charging connection portion 3 to the charging connection portion of the electric vehicle.

For the other vehicle charging device 30, the charging cable 4 is lifted up when the charging connection portion 3 is connected to the charging connection portion of the electric vehicle. Thus, it is possible to prevent damage to the coating of the charging cable 4 as the charging cable 4 does not contact the ground, and hence is not dragged on the ground, as in the vehicle charging device 1. Further, as there is no friction between the charging cable 4 and the ground, the performance in routing the charging cable 4 is improved. Thus, the user bears the reduced load in connecting the charging connection portion 3 to an electric vehicle.

Note that the cable holding structure in the vehicle charging device 1 described above can also be applied to a vehicle charging/discharging device. A vehicle charging/discharging device includes a charger/discharger that exchanges electric power with a storage battery for driving an electric vehicle. A vehicle charging/discharging device is charged with electric power supplied from a commercial system. The vehicle charging/discharging device supplies the electric power to a storage battery for driving an electric vehicle, such that the vehicle charging/discharging device can electrically charge the storage battery for driving the electric vehicle. A vehicle charging/discharging device is also a device that can discharge and supply electric power from a storage battery for driving an electric vehicle to household electrical equipment that is a residential load. In a case where the cable holding structure of the vehicle charging device 1 described above is applied to a vehicle charging/discharging device, the same effects as those of the vehicle charging device 1 can be achieved.

Figure 13:
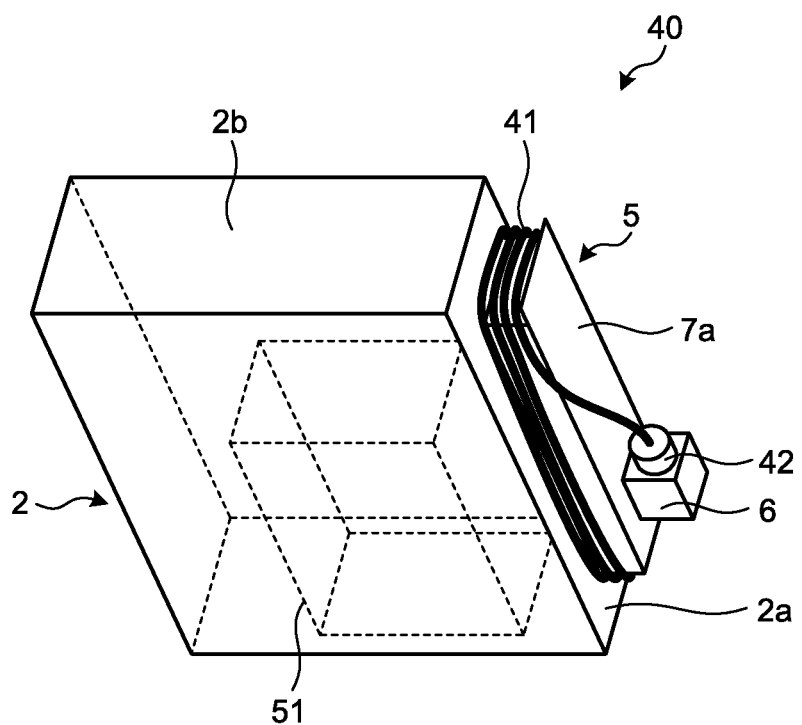
FIG. 13 is a perspective view of a vehicle charging/discharging device according to the first embodiment of the present invention.

FIG. 13 is a perspective view of a vehicle charging/discharging device 40 according to the first embodiment of the present invention. The vehicle charging/discharging device 40 includes a charger/discharger 51 that exchanges electric power with a storage battery for driving an electric vehicle. The vehicle charging/discharging device 40 has basically the same configuration as the vehicle charging device 1 described above. However, the vehicle charging/discharging device 40 differs from the vehicle charging device 1 in that the vehicle charging/discharging device 40 includes a charging/discharging cable 41 in place of the above-described charging cable 4, and a charging/discharging connection portion 42 in place of the charging connection portion 3, which is a connector connected to the electric vehicle.

Alternatively, the structure of the vehicle charging/discharging device 40 may be modified such that the internal and external positional relationship between the cable holder movable portion 7 and the cable holder guide portion 8 in the cable holder 5 is inverted, as illustrated in FIG. 10.

As described above, the vehicle charging device 1 according to the first embodiment produces the effects that the cable routing performance is improved with a simple structure, and the user bears the reduced load in connecting the charging connection portion 3 to an electric vehicle.

The configuration described in the above embodiment is an example of the subject matter of the present invention. Therefore, techniques according to the embodiment may be combined, or a technique according to the embodiment may be combined with some other known technique. The configuration described in the above embodiment may be partially omitted or modified without departing from the scope of the present invention.

REFERENCE SIGNS LIST

1, 30 vehicle charging device; 2 housing; 2a, 7a, 7d, 7e, 8b, 8d, 8e, 8f, 21a, 21b, 22a, 22b, 22c side surface; 2b, 6b, 7c, 8a, 21c upper surface; 3 charging connection portion; 4 charging cable; 5, 20 cable holder; 6 connection portion holder; 6a recess; 7, 21 cable holder movable portion; 7b guide portion; 8, 22 cable holder guide portion; 8c recess; 9 guide rail; 11 groove; 12, 24 opening; 50 charger; 51 charger/discharger.

The invention claimed is:

1. A vehicle charging device including a charger to electrically charge a storage battery mounted in an electric vehicle, the vehicle charging device comprising:
   a housing in which the charger is housed;
   a charging cable having one end side and an opposite end side, the one end side including an end portion connected to the charger, the opposite end side including an end portion connected to a connector to be connected to the electric vehicle, the opposite end side including a portion pulled out from an inside of the housing to an outside of the housing, and
   a cable holder provided on one side surface of the housing, the cable holder holding an intermediate portion of the charging cable pulled out to the outside of the housing, wherein
   the cable holder includes:
   a cable holder guide portion secured to the one side surface of the housing; and
   a cable holder movable portion attached to the cable holder guide portion such that the cable holder movable portion is movable in a height direction of the housing, and
   wherein the cable holder movable portion is configured to move along a longitudinal direction of the cable holder guide portion to a fixed position that secures the cable holder movable portion at a level at which a height of an upper surface of the cable holder movable portion is greater than a height of an upper surface of the housing.

2. The vehicle charging device according to claim 1, wherein,
   one of the cable holder movable portion and the cable holder guide portion has a fitting engagement protrusion, and the other has a fitting engagement receiving portion for fitting engagement with the fitting engagement protrusion, and,
   when the cable holder movable portion moves upward in the height direction of the housing, the fitting engagement protrusion fits tri the fitting engagement receiving portion to thereby fix a height position of the cable holder movable portion in the height direction of the housing.

3. The vehicle charging device according to claim 2, wherein
   the cable holder movable portion is disposed outside the cable holder guide portion;
   the fitting engagement protrusion is provided on an inside face of the cable holder movable portion, and
   the fitting engagement receiving portion is provided on a side surface of the cable holder guide portion, the side surface of the cable holder guide portion facing the inside face of the cable holder movable portion.

4. The vehicle charging device according to claim 3, wherein
   the cable holder movable portion has a guide rail provided thereon, the guide rail extending in the height direction of the housing, and
   the cable holder guide portion and the one side surface of the housing define a groove therebetween, the groove extending in the height direction of the housing, the groove limiting movement of the guide rail in directions other than the height direction of the housing with the guide rail fitting in the groove.

5. The vehicle charging device according to claim 4, wherein
   the fitting engagement protrusion is a leaf spring, and
   the fitting engagement receiving portion is an opening.

6. The vehicle charging device according to claim 3, wherein
   the fitting engagement protrusion is a leaf spring, and
   the fitting engagement receiving portion is an opening.

7. The vehicle charging device according to claim 2, wherein
   the cable holder guide portion is disposed outside the cable holder movable portion;
   the fitting engagement protrusion is provided on an inside face of the cable holder guide portion, and
   the fitting engagement receiving portion is provided on a side surface of the cable holder movable portion, the side surface of the cable holder movable portion facing the inside face of the cable holder guide portion.

8. The vehicle charging device according to claim 7, wherein
   the fitting engagement protrusion is a leaf spring, and
   the fitting engagement receiving portion is an opening.

9. The vehicle charging device according to claim 2, wherein
the fitting engagement protrusion is a leaf spring, and
the fitting engagement receiving portion is an opening.

10. A vehicle charging/discharging device including a charger/discharger to exchange electric power with a storage battery mounted in an electric vehicle, the vehicle charging/discharging device comprising:
a housing in which the charger/discharger is housed;
a charging/discharging cable having one end side and an opposite end side, the one end side including an end portion connected to the charger/discharger, the opposite end side including an end portion connected to a connector to be connected to the electric vehicle, the opposite end side including a portion pulled out from an inside of the housing to an outside of the housing; and
a cable holder provided on one side surface of the housing, the cable holder holding an intermediate portion of the charging/discharging cable pulled out to the outside of the housing, wherein
the cable holder includes:
a cable holder guide portion secured to the one side surface of the housing; and
a cable holder movable portion attached to the cable holder guide portion such that the cable holder movable portion is movable in a height direction of the housing, and
wherein the cable holder movable portion is configured to move along a longitudinal direction of the cable holder guide portion to a fixed position that secures the cable holder movable portion at a level at which a height of an upper surface of the cable holder movable portion is greater than a height of an upper surface of the housing.

11. The vehicle charging/discharging. device according to claim 10, wherein,
one of the cable holder movable portion and the cable holder guide portion has a fitting engagement protrusion, and the other has a fitting engagement receiving portion for fitting engagement with the fitting engagement protrusion, and,
when the cable holder movable portion moves upward in the height direction of the housing, the fitting engagement protrusion fits in the fitting engagement receiving portion to thereby fix a height position of the cable holder movable portion in the height direction of the housing.

12. The vehicle charging/discharging device according to claim 11, wherein
the cable holder movable portion is disposed outside the cable holder guide portion;
the fitting engagement protrusion is provided on an inside face of the cable holder movable portion, and
the fitting engagement receiving portion is provided on a side surface of the cable holder guide portion, the side surface of the cable holder guide portion facing the inside face of the cable holder movable portion.

13. The vehicle charging/discharging device according to claim 12, wherein
the cable holder movable portion has a guide rail provided thereon, the guide rail extending in the height direction of the housing, and
the cable holder guide portion and the one side surface of the housing defines a groove therebetween, the groove extending in the height direction of the housing, the groove limiting movement of the guide rail in directions other than the height direction of the housing with the guide rail fitting in the groove.

14. The vehicle charging/discharging device according to claim 13, wherein
the fitting engagement protrusion is a leaf spring, and
the fitting engagement receiving portion is an opening.

15. The vehicle charging/discharging device according to claim 12, wherein
the fitting engagement protrusion is a leaf spring, and
the fitting engagement receiving portion is an opening.

16. The vehicle charging/discharging device according to claim 11, wherein
the cable holder guide portion is disposed outside the cable holder movable portion;
the fitting engagement protrusion is provided on an inside face of the cable holder guide portion, and
the fitting engagement receiving portion is provided on a side surface of the cable holder movable portion, the side surface of the cable holder movable portion facing the inside face of the cable holder guide portion.

17. The vehicle charging/discharging. device according to claim 16, wherein
the fitting engagement protrusion is a leaf spring, and
the fitting engagement receiving portion is an opening.

18. The vehicle charging/discharging device according to claim 11, wherein
the fitting engagement protrusion is a leaf spring, and
the fitting engagement receiving portion is an opening.

* * * * *